(12) United States Patent
Li

(10) Patent No.: US 11,321,070 B2
(45) Date of Patent: May 3, 2022

(54) ONLINE UPGRADE METHOD AND APPARATUS FOR BLUETOOTH CLUSTER

(71) Applicant: SHENZHEN GOODIX TECHNOLOGY CO., LTD., Shenzhen (CN)

(72) Inventor: Mingfei Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 239 days.

(21) Appl. No.: 16/680,379

(22) Filed: Nov. 11, 2019

(65) Prior Publication Data
US 2020/0089489 A1    Mar. 19, 2020

Related U.S. Application Data

(63) Continuation of application No. PCT/CN2018/106045, filed on Sep. 17, 2018.

(51) Int. Cl.
*G06F 8/65*    (2018.01)
*H04W 4/80*    (2018.01)
(Continued)

(52) U.S. Cl.
CPC ............... *G06F 8/65* (2013.01); *H04W 4/08* (2013.01); *H04W 4/80* (2018.02); *H04W 40/32* (2013.01); *H04W 76/10* (2018.02)

(58) Field of Classification Search
CPC . G06F 8/65; H04W 4/08; H04W 4/80; H04W 40/32; H04W 76/10

(Continued)

(56) References Cited

U.S. PATENT DOCUMENTS 9,648,662 B2 *  5/2017  Herrala ................. H04W 84/20
10,541,868 B2 *  1/2020  Chou ........................ G06F 8/65
(Continued)

FOREIGN PATENT DOCUMENTS

CN    103927233 A    7/2014
CN    104168145 A    11/2014
(Continued)

OTHER PUBLICATIONS

EESR of EP18917576.3.
(Continued)

*Primary Examiner* — William Nealon
(74) *Attorney, Agent, or Firm* — J.C. Patents

(57) ABSTRACT

The present disclosure relates to the field of Internet of Things, and in particular, to an online upgrade method and apparatus for a Bluetooth cluster. The online upgrade method for the Bluetooth cluster includes: an upgrade device selects a central node in the Bluetooth cluster and establishes a Bluetooth connection with the central node; the upgrade device selects an upgrade path, and sends upgrade data to a to-be-upgraded device through the central node according to the upgrade path, enabling the to-be-upgraded device to obtain the upgrade data to achieve an upgrade, where the to-be-upgraded device includes a part or all of Bluetooth devices in the Bluetooth cluster. The online upgrade method of the Bluetooth cluster adopted in the present disclosure further broadens a communication range of the Bluetooth, which requires no one-to-one operation by a user.

9 Claims, 10 Drawing Sheets

(51) Int. Cl.
*H04W 76/10* (2018.01)
*H04W 4/08* (2009.01)
*H04W 40/32* (2009.01)

(58) Field of Classification Search
USPC .......................................................... 717/172
See application file for complete search history.

(56) References Cited

U.S. PATENT DOCUMENTS

2015/0089081 A1   3/2015   Thubert
2015/0094968 A1   4/2015   Jia

FOREIGN PATENT DOCUMENTS

| CN | 104184785 | A | 12/2014 |
| CN | 105430048 | A | 3/2016 |
| CN | 106681774 | A | 5/2017 |
| CN | 107041171 | A | 8/2017 |
| CN | 107241680 | A | 10/2017 |
| CN | 107360636 | A | 11/2017 |
| EP | 2 400 812 | A1 | 12/2011 |
| EP | 3 367 636 | A1 | 8/2018 |

OTHER PUBLICATIONS

NPL: "Distributed Self-Healing and Variable Topology Optimization Algorithms for QoS Provisioning in Scatternets", IEEE Journal on Selected Areas in Communications, IEEE Service Center, Piscataway, US, vol. 22, No. 7, Sep. 1, 2004.
Cuomo, Francesca et al, "Distributed Self-Healing and Variable Topology Optimization Algorithms for QoS Provisioning in Scatternets" IEEE Journal on Selected Areas in Communications; vol. 22, No. 7; (Sep. 2004); pp. 1220-1236.
The extended European Search Report of corresponding European application No. 18917576.3-1213, dated Mar. 13, 2020.
The first Office Action of CN application No. 2018800018730.
The Chinese International Search Report, including Written Opinion Report of corresponding International application No. PCT/CN2018/106045, dated Jun. 17, 2019.
Notice of Allowance of the priority application CN2018800018730.
NPL: "Discussion on the Network Security of Intelligent Building", Intelligent Building, vol. 8, Aug. 6, 2016, pp. 1-17.
NPL: "Survey: Inter-Satellite Networking Technologies of Distributed Space Systems", Space Electronic Technology, vol. 4, 2015, pp. 1-10.

\* cited by examiner

ONLINE UPGRADE METHOD AND APPARATUS FOR BLUETOOTH CLUSTER

CROSS-REFERENCE TO RELATED APPLICATIONS

This application is a continuation application of the International application PCT/CN2018/106045, filed on Sep. 17, 2018, entitled "ONLINE UPGRADE METHOD AND APPARATUS FOR BLUETOOTH CLUSTER", the content of which is hereby incorporated by reference in its entirety.

TECHNICAL FIELD

The present disclosure relates to the field of Internet of Things and, in particular, to an online upgrade method and apparatus for a Bluetooth cluster.

BACKGROUND

As application scenarios of Bluetooth devices in the field of Internet of Things are increasing, multiple Bluetooth devices can form a Bluetooth cluster to compensate for a flaw of a small coverage of the Bluetooth connections. With the increasing amount of the Bluetooth devices in the Bluetooth cluster, a one-to-one upgrade manner between Bluetooth cannot satisfy needs in some application scenarios such as intelligent buildings, smart homes and so forth, meanwhile, in order to upgrade the devices that are not easily accessible, multiple Bluetooth devices should be online ungraded simultaneously. Among the existing Bluetooth online upgrade technologies, the one-to-one upgrade technology is more common, but the upgrade efficiency is low. In the existing online upgrade technologies for the Bluetooth cluster, an upgrade of each Bluetooth device needs to obtain upgrade data from an upgrade device, which on one hand easily results in a congestion of the upgrade data in a single Bluetooth device and increases a difficulty in transmitting the upgrade data of the Bluetooth device, thus leading to a low upgrade success rate. On the other hand, in the case of a large-scale and multiple-layer Bluetooth cluster, time-consumption of the upgrade is significantly increased.

SUMMARY

The present disclosure provides an online upgrade method and apparatus for a Bluetooth cluster, relating to the problem that the Bluetooth cluster upgrade success rate is low and the upgrade time-consumption is long.

A first aspect of an embodiment of the present disclosure provides an online upgrade method for a Bluetooth cluster, including: selecting, by an upgrade device, a central node in the Bluetooth cluster and establishing a Bluetooth connection with the central node; selecting, by the upgrade device, an upgrade path, and sending upgrade data to a to-be-upgraded device through the central node according to the upgrade path, enabling the to-be-upgraded device to obtain the upgrade data to achieve an upgrade, where the to-be-upgraded device includes a part or all of Bluetooth devices in the Bluetooth cluster.

In addition, in combination with the first aspect, in an implementation of the first aspect, before the selecting, by an upgrade device, a central node in the Bluetooth cluster, the method further includes: establishing, by the upgrade device, a connection with a Bluetooth device that has turned on a broadcast in the Bluetooth cluster; sending, by the Bluetooth device, an instruction for turning on a broadcast to a Bluetooth device that has not turned on the broadcast in the Bluetooth cluster through the Bluetooth device connected to the upgrade device; and updating, by the upgrade device, scanned Bluetooth devices.

In addition, in combination with the first aspect and the above implementation, in another implementation of the first aspect, a method for selecting the central node in the Bluetooth cluster by the upgrade device includes: selecting, by the upgrade device according to strengths of receiving powers of the Bluetooth devices scanned by the upgrade device, one or more Bluetooth devices with a strongest receiving power as the central note of the Bluetooth cluster; or selecting, by the upgrade device according to amounts of next-level Bluetooth devices connected to the Bluetooth devices scanned by the upgrade device, one or more Bluetooth devices with a largest amount of next-level Bluetooth devices connected as the central node of the Bluetooth cluster.

In addition, in combination with the first aspect and the above implementation, in another implementation of the first aspect, after the establishing, by the upgrade device, a Bluetooth connection with the central node, the method further includes: sending, by the upgrade device, a device information request instruction to all of the Bluetooth devices in the Bluetooth cluster through the central node; receiving, by the upgrade device, device information of all of the Bluetooth devices sent by the central node; and determining, by the upgrade device, the to-be-upgraded device.

In addition, in combination with the first aspect and the above implementation, in another implementation of the first aspect, the method for selecting the upgrade path by the upgrade device includes: querying, by the upgrade device, to an outer layer with the central node as a center, and determining a preceding Bluetooth device for the to-be-upgraded device; and generating, by the upgrade device, the upgrade path according to the to-be-upgraded device and the preceding Bluetooth device corresponding to the to-be-upgraded device.

In addition, in combination with the first aspect and the above implementation, in another implementation of the first aspect, the querying, by the upgrade device, to an outer layer with the central node as a center, and determining a preceding Bluetooth device for the to-be-upgraded device includes: selecting, according to a connection cost from the central node to the to-be-upgraded device, one or more to-be-upgraded devices with a least connection cost as a first device, and recording a corresponding central node as a preceding Bluetooth device of the to-be-upgraded device with the least connection cost, where a to-be-upgraded device other than the first device is a second device; selecting, according to a connection cost from the central node or the first device to the second device, one or more to-be-upgraded devices with a least connection cost from the second device to join the first device, and recording a corresponding first device as a preceding Bluetooth device of the to-be-upgraded device with the least connection cost; and repeating the previous step until preceding Bluetooth devices for all to-be-upgraded devices are determined.

In addition, in combination with the first aspect and the above implementation, in another implementation of the first aspect, after the selecting, by the upgrade device, an upgrade path, further includes: setting, by the upgrade device, the upgrade path into the upgrade data; or sending, by the upgrade device, the upgrade path to the to-be-upgraded device through the central node.

A second aspect of the embodiment of the present disclosure provides an online upgrade method for a Bluetooth cluster, including: receiving, by a Bluetooth device, upgrade data and an upgrade path, where the upgrade path includes information about a to-be-upgraded device and a preceding Bluetooth device corresponding to the to-be-upgraded device determined by an upgrade device, and the to-be-upgraded device includes a part or all of Bluetooth devices in the Bluetooth cluster; sending, by the Bluetooth device, the upgrade data and the upgrade path to a next-level to-be-upgraded device in the upgrade path; and receiving, by the Bluetooth device, upgrade result information sent by a next-level Bluetooth device in the upgrade path, and sending the upgrade result information to a preceding Bluetooth device of the Bluetooth device or the upgrade device.

In addition, in combination with the second aspect, in an implementation of the second aspect, before the receiving, by a Bluetooth device, upgrade data and an upgrade path, the method further includes: receiving, by the Bluetooth device, a device information request instruction sent by an upper-level Bluetooth device connected to the Bluetooth device or the upgrade device, and sending the device information request instruction to a next-level Bluetooth device connected to the Bluetooth device; and receiving, by the Bluetooth device, device information sent by the next-level Bluetooth device connected to the Bluetooth device, and sending the device information and device information of the Bluetooth device to the upgrade device or the upper-level Bluetooth device connected to the Bluetooth device.

In addition, in combination with the second aspect and the above implementation, in another implementation of the second aspect, after the sending, by the Bluetooth device, the upgrade result information to a preceding Bluetooth device of the Bluetooth device or the upgrade device, the method further includes: executing, by the Bluetooth device, an upgrade using the upgrade date; and sending, by the Bluetooth device, upgrade result information of the Bluetooth device to the preceding Bluetooth device of the Bluetooth device or the upgrade device according to the upgrade path.

The third aspect of the embodiment of the present disclosure provides an upgrade device for an online upgrade of a Bluetooth cluster, the upgrade device includes: a first connecting module, configured to select a central node in the Bluetooth cluster, and establish a Bluetooth connection with the central node; and an upgrading module, configured to select an upgrade path, and send upgrade data to a to-be-upgraded device through the central node according to the upgrade path, enabling the to-be-upgraded device to obtain the upgrade data to achieve an upgrade, where the to-be-upgraded device includes a part or all of Bluetooth devices in the Bluetooth cluster.

In addition, in combination with the third aspect, in an implementation of the third aspect, the upgrade device further includes: a second connecting module, configured to establish a connection with a Bluetooth device that has turned on a broadcast in the Bluetooth cluster before the first connecting module selects the central node in the Bluetooth cluster; a first sending module, configured to send an instruction for turning on a broadcast to a Bluetooth device that has not turned on the broadcast in the Bluetooth cluster through the Bluetooth device connected to the second connecting module; and a scanning module, configured to update scanned Bluetooth devices.

In addition, in combination with the third aspect and the above implementation, in another implementation of the third aspect, the first connecting module further includes: a first selecting submodule, configured to select, according to strengths of receiving powers of the Bluetooth devices scanned by the scanning module, one or more Bluetooth devices with a strongest receiving power as the central node of the Bluetooth cluster; or select, according to amounts of next-level Bluetooth devices connected to the Bluetooth devices scanned by the scanning module, one or more Bluetooth devices with a largest amount of next-level Bluetooth devices connected as the central node of the Bluetooth cluster.

In addition, in combination with the third aspect and the above implementation, in another implementation of the third aspect, the upgrade device further includes: a second sending module, configured to send a device information request instruction to all of the Bluetooth devices in the Bluetooth cluster through the central node, after the first connecting module establishes the Bluetooth connection with the central node; a first receiving module, configured to receive device information of all of the Bluetooth devices sent by the central node; and a second selecting module, configured to determine the to-be-upgraded device.

In addition, in combination with the third aspect and the above implementation, in another implementation of the third aspect, the upgrading module includes: a querying submodule, configured to query to an outer layer with the central node as a center, and determine preceding Bluetooth devices for all the to-be-upgraded devices; and a path generating submodule, configured to generate the upgrade path according to the to-be-upgraded device and the preceding Bluetooth device corresponding to the to-be-upgraded device.

In addition, in combination with the third aspect and the above implementation, in another implementation of the third aspect, the querying submodule includes: a preceding Bluetooth device determining unit, configured to select, according to a connection cost from the central node to the to-be-upgraded device, one or more to-be-upgraded devices with a least connection cost as a first device, where a to-be-upgraded device other than the first device is a second device; record a corresponding central node as a preceding Bluetooth device of the to-be-upgraded device with the least connection cost; select, according to a connection cost from the central node or the first device to the second device, one or more to-be-upgraded devices with a least connection cost to join the first device, and record a corresponding first device as a preceding Bluetooth device of the to-be-upgraded device with the least connection cost; repeat the previous step until preceding Bluetooth devices for all of the to-be-upgraded device are determined.

In addition, in combination with the third aspect and the above implementation, in another implementation of the third aspect, the upgrading module further includes: a setting submodule, configured to set the upgrade path into the upgrade data; or the upgrading module is further configured to send the upgrade path to the to-be-upgraded device through the central node.

A fourth aspect of the present disclosure provides a Bluetooth device for an online upgrade of a Bluetooth cluster, the Bluetooth device includes: a second receiving module, configured to receive upgrade data and an upgrade path, where the upgrade path includes information about a to-be-upgraded device and a preceding Bluetooth device corresponding to the to-be-upgraded device determined by an upgrade device, and the to-be-upgraded device includes a part or all of Bluetooth devices in the Bluetooth cluster; a third sending module, configured to send the upgrade data and the upgrade path to a next-level to-be-upgraded device in the upgrade path; a third receiving module, configured to receive upgrade result information sent by a next-level Bluetooth device in the upgrade path; and a fourth sending module, configured to send the upgrade result information to a preceding Bluetooth device of the Bluetooth device or the upgrade device.

In addition, in combination with the fourth aspect, in an implementation of the fourth aspect, the Bluetooth device further includes: a fourth receiving module, configured to receive a device information request instruction sent by an upper-level Bluetooth device connected to the Bluetooth device or the upgrade device, before the first receiving module receives the upgrade data and the upgrade path; a fifth sending module, configured to send the device information request instruction to a next-level Bluetooth device connected to the Bluetooth device; a fifth receiving module, configured to receive device information sent by the next-level Bluetooth device connected to the Bluetooth device; and a sixth sending module, configured to send the device information to the upgrade device, or send the device information and device information of the Bluetooth device to the upper-level Bluetooth device connected to the Bluetooth device.

In addition, in combination with the fourth aspect, in another implementation of the fourth aspect, the Bluetooth device further includes: an upgrade executing module, configured to execute an upgrade on the Bluetooth device according to the update data, after the fourth sending module sends the upgrade result information to the preceding Bluetooth device of the Bluetooth device or the upgrade device; and a seventh sending module, configured to send upgrade result information of the Bluetooth device to the preceding Bluetooth device of the Bluetooth device or the upgrade device according to the upgrade path.

A fifth aspect of an embodiment of the present disclosure provides an upgrade device for online upgrade of a Bluetooth cluster, including: a memory and a processor; the memory is coupled to the processor; the memory, configured to store program instructions; the processor, configured to invoke the program instruction stored in the memory, enabling the upgrade device to execute the online upgrade method of the Bluetooth cluster according to the first aspect above.

A sixth aspect of an embodiment of the present disclosure provides a Bluetooth device for an online upgrade of a Bluetooth cluster, including: a memory and a processor; the memory is coupled to the processor; the memory, configured to store program instructions; the processor, configured to invoke the program instructions stored in the memory, enabling the Bluetooth device to execute the online upgrade method of the Bluetooth cluster according to the second aspect above.

A seventh aspect of the embodiments of the present disclosure provides a computer readable storage medium, including: a computer program stored thereon, the computer program is executed by a processor to implement the online upgrade method of the Bluetooth cluster according to the first aspect.

An eighth aspect of the embodiments of the present disclosure provides a computer readable storage medium, including: a computer program stored thereon, the computer program is executed by a processor to implement the online upgrade method of the Bluetooth cluster according to the second aspect.

Compared with the prior art, the advantageous effects of the embodiments of the present disclosure are as follows: the embodiment of the present disclosure provides an online upgrade method and apparatus of a Bluetooth cluster, where a central node is selected to establish a Bluetooth connection with an upgrade device to transit upgrade data according to a connection relationship between Bluetooth devices in a Bluetooth cluster, and an upgrade path is selected and an upgrade is executed on a to-be-upgraded device in the Bluetooth cluster according to the upgrade path. In this way, an upgrade success rate of the Bluetooth cluster is improved, and upgrade time-consumption is shortened. The online upgrade method of the Bluetooth cluster adopted in the present disclosure further broadens a communication range of the Bluetooth, which requires no one-to-one operation by a user and saves operation time. Furthermore, the connections among the Bluetooth devices in the existing Bluetooth cluster are used to send the upgrade data, on one hand, the upgrade device does not need to send upgrade data for multiple times, thus solving the data congestion problem caused by multiple Bluetooth devices accessing the upgrade device at the same time; on the other hand, since the upgrade data of most of the Bluetooth devices does not need to be directly obtained from the upgrade device, the amount of Bluetooth devices, through which the upgrade data is transmitted, is significantly reduced, thus making the upgrade time-consumption significantly reduced for a large-scale Bluetooth cluster with a large number of layers. Moreover, the upgrade of multiple Bluetooth devices in the Bluetooth cluster can be completed simply through operations on the upgrade device side, thereby providing more convenient and more efficient services for the user.

BRIEF DESCRIPTION OF DRAWING(S)

In order to illustrate the embodiments of the present disclosure or the technical solutions in the prior art more clearly, the drawings used in the embodiments or the description of the prior art will be briefly described below. Obviously, the drawings in the following description are only certain embodiments of the present disclosure, and other drawings can be obtained according to the drawings without any creative labor for those skilled in the art.

DESCRIPTION OF EMBODIMENTS

In order to make the objects, technical solutions and advantages of the present disclosure more clear, some embodiments of the present disclosure will be described in detail by way of example with reference to the accompanying drawings. However, those skilled in the art will appreciate that in the examples, numerous technical details are set forth in order to provide the reader with a better understanding of the application. However, the technical solutions claimed in the present disclosure can be implemented without these technical details as well as various changes and modifications based on the following embodiments.

Figure 1:
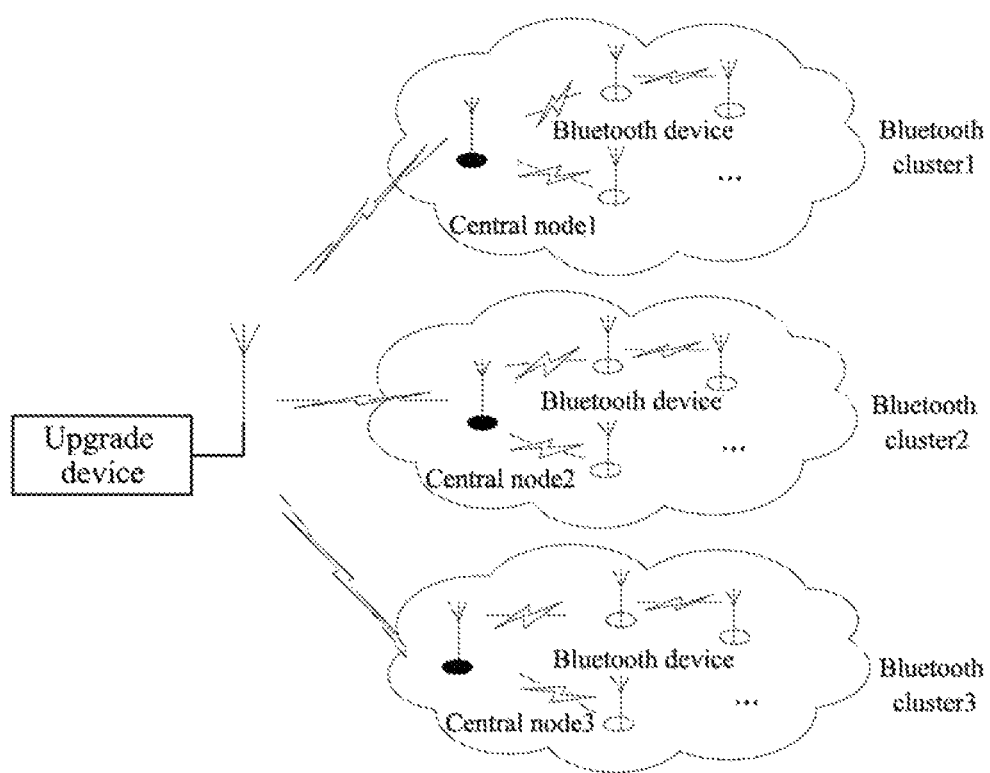
FIG. 1 is a system block diagram of an online upgrade method of a Bluetooth cluster according to an embodiment of the present disclosure.

Referring to FIG. 1, which is a system block diagram of an online upgrade method of a Bluetooth cluster according to an embodiment of the present disclosure. The embodiment describes the online upgrade method of the Bluetooth cluster provided by an embodiment of the present disclosure from the perspective of an upgrade device. The Bluetooth cluster is a group of independent, wirelessly interconnected devices; a Bluetooth cluster group represents multiple independent Bluetooth clusters, where the Bluetooth clusters are not directly connected to each other. According to the embodiment of the present disclosure, the online upgrade method of the Bluetooth cluster is used for executing online upgrade for some or all of the Bluetooth devices in the Bluetooth cluster or the Bluetooth cluster group simultaneously. The embodiment is described by taking the upgrade of some or all of the Bluetooth devices in one Bluetooth cluster as an example, while those skilled in the art should understand that selecting one Bluetooth cluster for upgrading is only an exemplary description, and in actual use, those skilled in the art can refer to the solution of the embodiment of the present disclosure to select the Bluetooth cluster group for upgrading, that is, selecting multiple Bluetooth clusters for upgrading. Similarly, the embodiment is described by taking the selection of one Bluetooth device as a central node as an example, but those skilled in the art should understand that the selection of one Bluetooth device as the central node is only an exemplary description, while in actual use, those skilled in the art may refer to the solution of the embodiment of the present disclosure to select multiple Bluetooth devices in the Bluetooth cluster as the central nodes, to achieve the online upgrade for the Bluetooth cluster; those skilled in the art can also refer to the solution of the embodiment of the present disclosure, when upgrading the Bluetooth clusters in the Bluetooth cluster group, for each Bluetooth cluster, selecting one or more Bluetooth devices from the Bluetooth cluster as the central node to implement the online upgrade of the Bluetooth cluster group. The Bluetooth device in the embodiment supports a multi-connection low-power Bluetooth protocol or a classic Bluetooth protocol, which is not limited in the embodiment.

Figure 2:
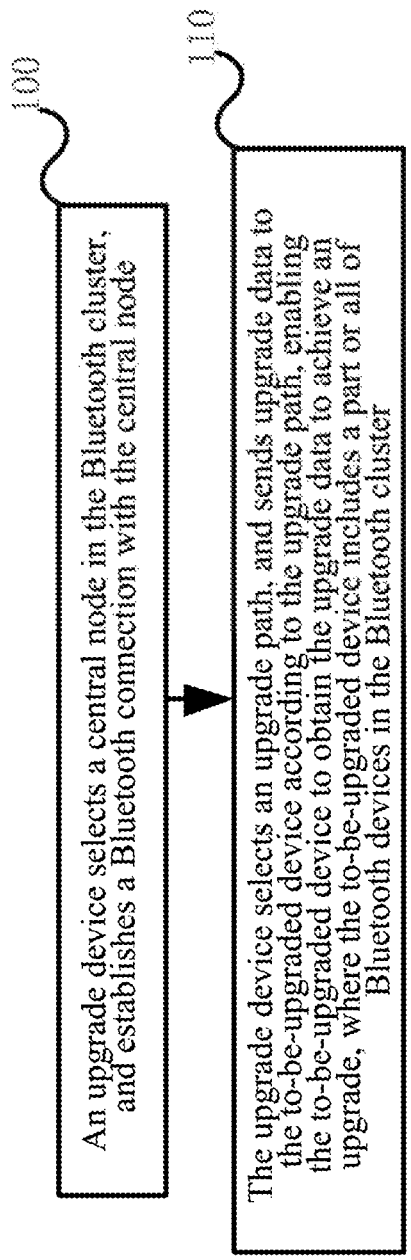
FIG. 2 is a flowchart of an online upgrade method of a Bluetooth cluster on an upgrade device side according to an embodiment of the present disclosure.

Referring to FIG. 2, which is a flowchart of an online upgrade method of a Bluetooth cluster according to an embodiment of the present disclosure, the method includes:

Step 100: An Upgrade Device Selects a Central Node in the Bluetooth Cluster, and Establishes a Bluetooth Connection with the Central Node.

Where the upgrade device may be a terminal device (including but not limited to a mobile phone or a computer) with storage and calculation capabilities and with a Bluetooth connection function. In addition, the upgrade device also includes an upgrade management software and a user interface running on the upgrade device for user operation.

Before the upgrade device selecting the central node, there should be a Bluetooth device in the Bluetooth cluster, which has turned on a broadcast and could be scanned by the upgrade device, the purpose of which is to enable the upgrade device to select different central nodes according to different application scenarios to satisfy different user requirements.

Figure 3:
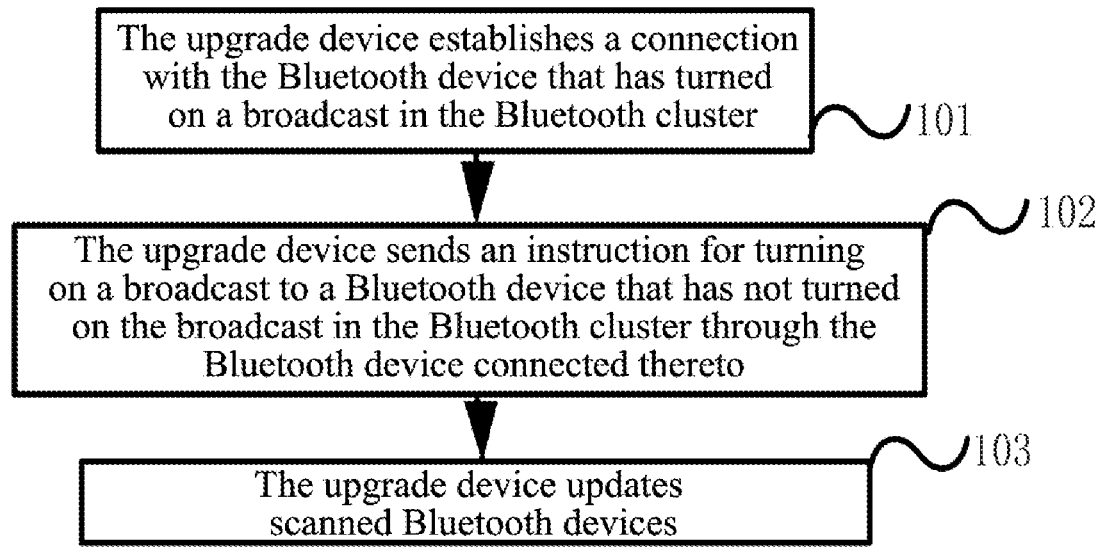
FIG. 3 is a flowchart of steps before an upgrade device selecting a central node in a Bluetooth cluster according to an embodiment of the present disclosure.

Optionally, referring to FIG. 3, in order to achieve this purpose, the operation before the upgrade device selecting the central node in the Bluetooth cluster includes the following three steps:

step 101: the upgrade device establishes a connection with the Bluetooth device that has turned on a broadcast in the Bluetooth cluster.

In step 101, the upgrade device establishes the connection with the Bluetooth device that has turned on the broadcast until the upgrade device has scanned the Bluetooth device that has turned on the broadcast in the Bluetooth cluster, where the Bluetooth device which has turned on the broadcast and is scanned by the upgrade device may be one or more Bluetooth devices, if the upgrade device has scanned no Bluetooth device that has turned on the broadcast, that is, all of the Bluetooth devices have not turned on the broadcast or the Bluetooth device that has turned on the broadcast is not within the scan range of the upgrade device, one or more Bluetooth devices in adjacent of the upgrade device need to be set to turn on the broadcast, thus enabling the upgrade device to scan them.

Step 102: the upgrade device sends an instruction for turning on a broadcast to a Bluetooth device that has not turned on the broadcast in the Bluetooth cluster through the Bluetooth device connected thereto.

In step 102, after the upgrade device connecting to the Bluetooth device that has turned on the broadcast through the Bluetooth, the upgrade device sends the instruction for turning on the broadcast to the Bluetooth device that has not turned on the broadcast in the Bluetooth cluster through the Bluetooth device connected thereto, and the Bluetooth device turns on its own broadcast after receiving the instruction for turning on the broadcast to facilitate the scanning from the upgrade device. Where the ones connected to the upgrade device may be one or more Bluetooth devices in the Bluetooth cluster, and the upgrade device may turn on the broadcasts of all of the Bluetooth devices in the Bluetooth cluster through the Bluetooth device connected thereto; for the Bluetooth cluster group, the upgrade device can connect to one or more Bluetooth devices in each Bluetooth cluster, the upgrade device may turn on the broadcasts of all of the Bluetooth devices in the corresponding Bluetooth cluster through the Bluetooth device connected thereto, so that the upgrade device can scan the Bluetooth devices and select the central node for the Bluetooth cluster which needs to be upgraded from the scanned Bluetooth devices.

Step 103: the upgrade device updates scanned Bluetooth devices.

In step 103, after all of the Bluetooth devices in the Bluetooth cluster turn on the broadcasts, the upgrade device can scan a largest amount of Bluetooth devices. It should be noted herein that, although all of the Bluetooth devices have turned on their broadcasts, the upgrade device may simply scan a part of Bluetooth devices that have turned on their broadcasts, possibly because the upgrade device is too far away from some Bluetooth devices. After scanning the Bluetooth devices in the Bluetooth cluster, the upgrade device selects, among the scanned Bluetooth devices, one or more Bluetooth devices as the central node; for the Bluetooth cluster group, after scanning multiple Bluetooth devices in multiple Bluetooth clusters, the upgrade device may select, among the scanned Bluetooth devices, one or more Bluetooth devices as the central node of the Bluetooth cluster in which they are located.

Optionally, the upgrade device may select the central node in the Bluetooth cluster in the following two manners:

one manner is that, the upgrade device selects one or more Bluetooth devices with the strongest receiving power as the central node of the Bluetooth cluster according to strengths of the receiving powers of the Bluetooth devices scanned by the upgrade device. The central node functions as a communication bridge between the upgrade device and the Bluetooth devices in the Bluetooth cluster, this manner for selecting the central node ensures a stability of the connection between the upgrade device and the central node, that is, the stability of the communication between the upgrade device and the Bluetooth devices in the Bluetooth cluster is guaranteed, thereby ensuring a success rate of data transmission, and greatly reducing a probability of requesting a retransmission due to a data transmission failure, the data includes but is not limited to a device information request instruction, upgrade data, an upgrade path and upgrade result information.

Another manner is that, the upgrade device selects one or more Bluetooth devices with the largest amount of next-level Bluetooth devices connected as the central node of the Bluetooth cluster according to the amounts of next-level Bluetooth devices connected to the Bluetooth devices scanned by the upgrade device. In order to implement this manner for selecting the central node, connection information may be added to a broadcast packet of the Bluetooth device, so that after scanning the Bluetooth device, the upgrade device can obtain the amount of Bluetooth devices connected to said Bluetooth device. In this way, the amount of the next-level Bluetooth devices connected to the central node is the largest, there may be more parallel paths for data transmission, and the transmission of data from the upgrade device to all the to-be-upgraded devices may be faster, the data includes but is not limited to the device information request instruction, the upgrade data, the upgrade path, and the upgrade result information.

It can be seen from the above two manners for selecting the central node that the central node can be any one or more Bluetooth devices in the Bluetooth cluster, and is not required to have connection capabilities other than Bluetooth.

The embodiment simply cites two manners for selecting the central node, but it should be understood by those skilled in the art that these two manners for selecting the central node is merely an exemplary description, while in actual use, those skilled in the art may refer to the solution of the embodiment of the present disclosure, to obtained other manners for selecting the central node according to the two manners for selecting the central node without paying any creative labor.

Where after selecting one or more central nodes, the upgrade device establishes the connection with the selected central node through the Bluetooth.

Optionally, after establishing the connection with the central node, the upgrade device can turn off the broadcasts of all Bluetooth devices in the Bluetooth cluster, disconnect the connections between the upgrade device and other Bluetooth devices and stop a scan mode, so as to ensure a lower power consumption. In addition, after establishing the connection between the upgrade device and the central node, the upgrade device can encrypt the connection to ensure a security of transmitted data.

After establishing the Bluetooth connection with the central node, the upgrade device needs to determine the to-be-upgraded device in the Bluetooth cluster. The to-be-upgraded device is the Bluetooth device selected by the user that needs to be upgraded, where the central node can also be selected as the to-be-upgraded device, however, since the central node can directly communicate with the upgrade device while other to-be-upgraded devices cannot, thus the central node is separately defined. Therefore, in the embodiment, the to-be-upgraded device is described as the Bluetooth device other than the central node that needs to be upgraded.

Figure 4:
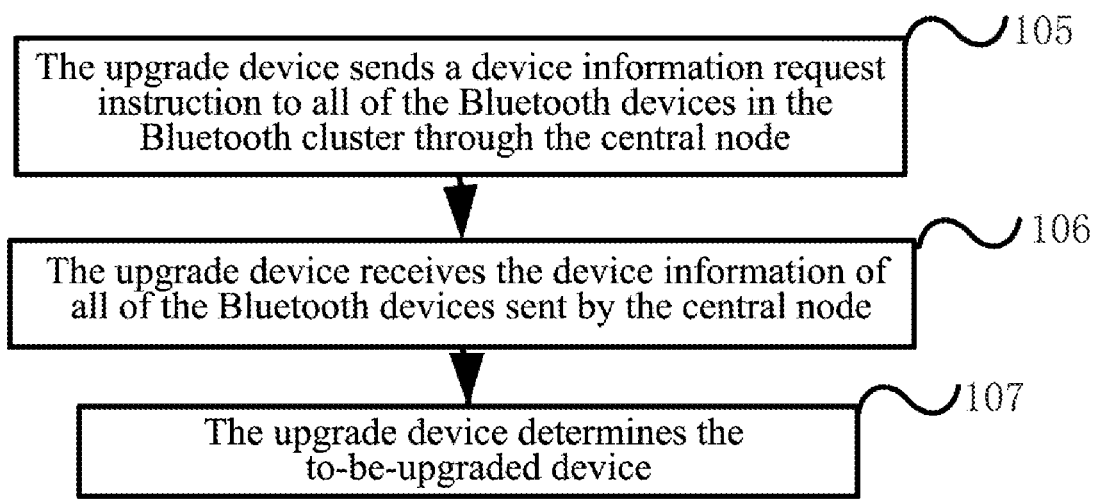
FIG. 4 is a flowchart of steps after an upgrade device establishing a Bluetooth connection with a central node according to an embodiment of the present disclosure.

Optionally, referring to FIG. 4, in order to determine the to-be-upgraded device, the steps after the upgrade device establishing the Bluetooth connection with the central node include:

105: the upgrade device sends a device information request instruction to all of the Bluetooth devices in the Bluetooth cluster through the central node.

In step 105, the upgrade device sends the device information request instruction to the central node with which the connection has been established, after receiving the device information request instruction sent by the upgrade device, the central node sends the device information request instruction to the Bluetooth device connected thereto, and the Bluetooth device that receives the device information request instruction sends the device information request instruction to a further Bluetooth device until all of the Bluetooth devices in the Bluetooth cluster receive the device information request instruction. Where the device information request instruction is used to enable the Bluetooth device that receives the device information request instruction to send its own device information to an upper-level Bluetooth device, the upper-level Bluetooth device generally refers to the Bluetooth device sending the device information request instruction connected thereto; where after receiving the device information request instruction sent by the upgrade device, the central node not only sends the device information request instruction to the Bluetooth device connected thereto, but also sends its own device information to the upgrade device.

106: the upgrade device receives the device information of all of the Bluetooth devices sent by the central node.

In step 106, after receiving the device information request instruction, the central node sends its own device information to the upgrade device. Since the upgrade device is only connected to the central node, the device information of other Bluetooth devices except the central node is sent to the central node firstly, which will be sent to the upgrade device by the central node subsequently. The device information includes, but is not limited to a device number, a device address, a device name, connection information, a current software version and a received signal strength indication (RSSI).

107: the upgrade device determines the to-be-upgraded device.

In step 107, after receiving all the device information in the Bluetooth cluster, the upgrade device may generate a network topology based on the device number, the device address, the device name, the connection information and the current software version of the Bluetooth device according to the connection relationship between the Bluetooth devices and the received signal strength, a user can select the to-be-upgraded device according to the requirement.

Step 110: The Upgrade Device Selects an Upgrade Path, and Sends Upgrade Data to the to-be-Upgraded Device According to the Upgrade Path, Enabling the to-be-Upgraded Device to Obtain the Upgrade Data to Achieve an Upgrade, where the to-be-Upgraded Device Includes a Part or all of Bluetooth Devices in the Bluetooth Cluster.

In step 110, there may be commonly a plurality of data transmission paths between the to-be-upgraded device and a certain to-be-upgraded device, and the upgrade path needs to be selected for the to-be-upgraded device. Where the upgrade data includes all relevant information for performing the upgrade of the Bluetooth device, which includes but is not limited to upgrade mode information and an upgrade version data package.

Optionally, the step of the upgrade device selecting the upgrade path includes:

the upgrade device queries to an out layer from the central node as a center and determines a preceding Bluetooth device for the to-be-upgraded device; and the upgrade device generates the upgrade path based on the to-be-upgraded device and the preceding Bluetooth device corresponding to the to-be-upgraded device.

Where the preceding Bluetooth device of the to-be-upgraded device may be determined based on different criteria, for example, the central node may be the preceding Bluetooth device of all the to-be-upgraded devices M connected thereto, and M may be the preceding Bluetooth device of all the to-be-upgraded devices N connected to M, the connection herein refers to the connection that does not pass by (cross) other to-be-upgraded devices, and only connection is used as a criterion to determine the preceding Bluetooth device, when a certain to-be-upgraded device receives the upgrade data, it no longer receives upgrade data from other preceding Bluetooth devices.

Since the distances among the to-be-upgraded devices are different or a further Bluetooth device is required to forward data due to the fact that there is no direct connection from one to-be-upgraded device to another to-be-upgraded device, therefore, the stabilities of these data transmission paths are different, however, a low stability will result in multiple data retransmissions, in order to avoid this situation and improve the upgrade efficiency as well as the success rate, a connection cost between the Bluetooth devices can be used to determine the upgrade path. Defining $D(x, y)$ as the connection cost for data sent from a Bluetooth device x to a Bluetooth device y. Generally, the connection cost for data sent from the Bluetooth device x to the Bluetooth device y is roughly equal to the connection cost for data sent from the Bluetooth device y to the Bluetooth device x. Since the received signal strength (RSSI) is usually negative, $-RSSI(x,y)$ is set as the connection cost from x to y, that is, $D(x,y)=-RSSI(x,y)$, the larger the RSSI, the smaller the connection cost, and the more stable the connection.

Figure 5:
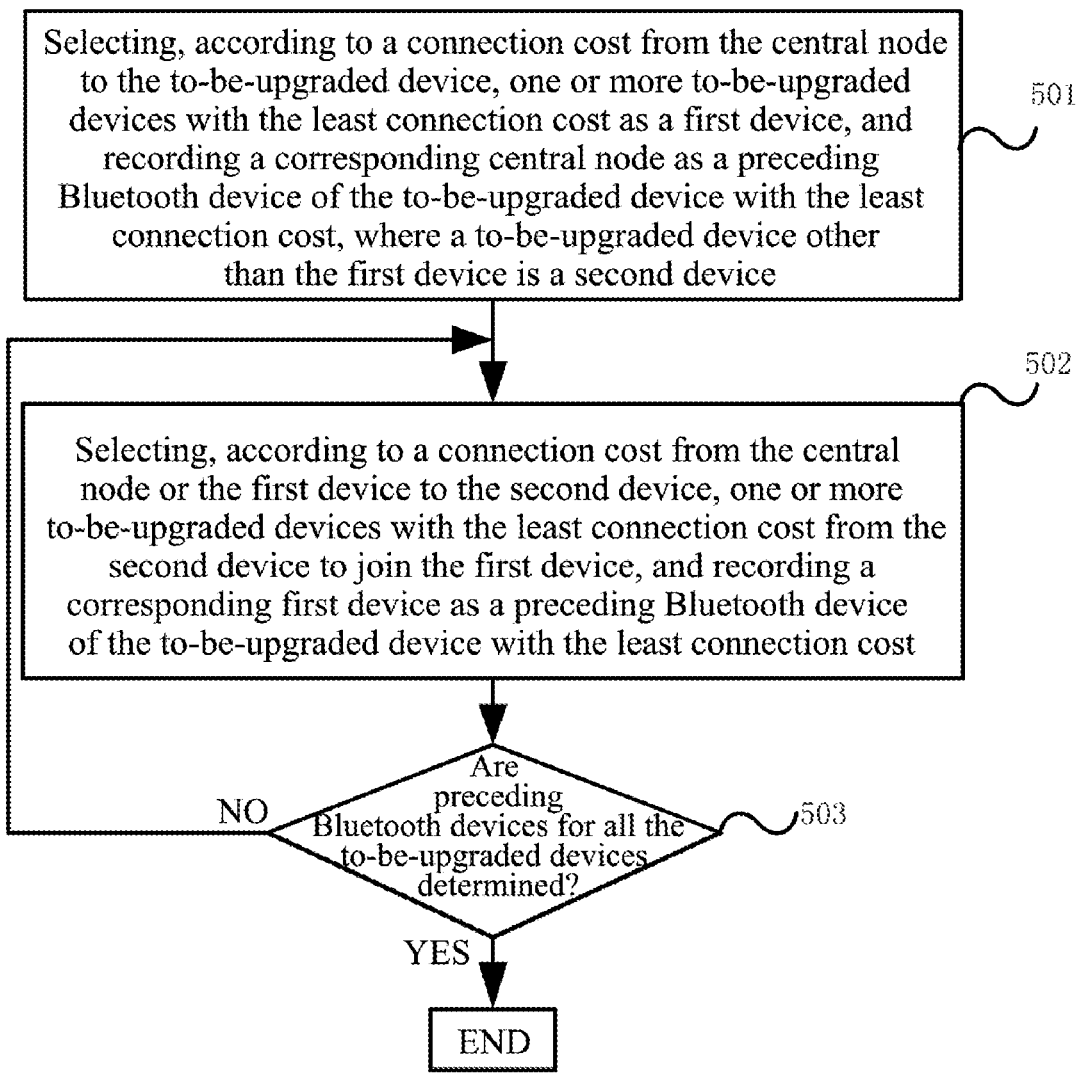
FIG. 5 is a flowchart of steps of a central node querying to an outer layer with a central node as a center, and determining a preceding Bluetooth device for a to-be-upgraded device, according to an embodiment of the present disclosure.

Optionally, referring to FIG. 5, where the upgrade device querying to an out layer with the central node as the center, and determining the preceding Bluetooth device for the to-be-upgraded device includes:

step 501: selecting, according to a connection cost from the central node to the to-be-upgraded device, one or more to-be-upgraded devices with the least connection cost as a first device, and recording a corresponding central node as a preceding Bluetooth device of the to-be-upgraded device with the least connection cost, where a to-be-upgraded device other than the first device is a second device;

step 502: selecting, according to a connection cost from the central node or the first device to the second device, one or more to-be-upgraded devices with the least connection cost from the second device to join the first device, and recording a corresponding first device as a preceding Bluetooth device of the to-be-upgraded device with the least connection cost; and step 503: repeating step 502 until preceding Bluetooth devices for all the to-be-upgraded devices are determined.

In step 502, the connection cost from the central node or the first device to the second device may be calculated in at least two manners, the first manner is as follows: taking the central node as a starting point, calculating the connection cost from the central node to any Bluetooth device in the second devices, and the second manner is as follows: taking the central node and any Bluetooth device in the first devices as a starting point in turn, calculating the connection cost to any Bluetooth device in the second devices, and selecting one or more to-be-upgraded devices with the least connection cost from the second devices to join the first devices, and recording the corresponding first device as the preceding Bluetooth device of the to-be-upgraded device with the least connection cost. Note that the preceding Bluetooth device of the to-be-upgraded device in the second devices may be one or more, the to-be-upgraded devices in the second devices may have the same preceding Bluetooth device, and the to-be-upgraded devices with the same preceding Bluetooth device are same-level to-be-upgraded devices.

When the upgrade device queries from the central node as the center to the out layer, if there is a relay node C that does not need to be upgraded between a to-be-upgraded device A and a to-be-upgraded device B, that is, C is a Bluetooth device that only needs to transmit data but does not need to be upgraded, the connection cost between the two to-be-upgraded devices A and B, is then the maximum value between the connection cost from A to C and the connection cost from C to B; if there is a to-be-upgraded device C between A and B, A is the first device, C and B are both second devices, then the connection cost between A and B is defined as infinity, this definition avoids a cross-level calculation of the connection cost, where the cross-level directs at the second device, if there is a to-be-upgraded device C between A and B, and B and C are both second devices, A is a first device, then the connection cost from A to B through C must be greater than or equal to the connection cost from A to C, therefore, in order to find the least connection cost for the next-level to-be-upgraded device, the cross-level is unnecessary, only the next-level to-be-upgraded device to A is calculated; if there is a to-be-upgraded device C between A and B, A and C are both first devices, and B is a second device, then the connection cost between A and B is defined as the maximum value between the connection cost between A and C and the connection cost between C and B, since the non-cross-level calculation is for the second device, and the path from A to B passes only the first device C rather than other second devices, it should be noted that the case where C is present between A and B is only an exemplary description, in actual use, there may be multiple points between A and B. Those skilled in the art may refer to the solution of the embodiment of the present disclosure to obtain the connection cost between two Bluetooth devices in other connection situations.

Figure 6:
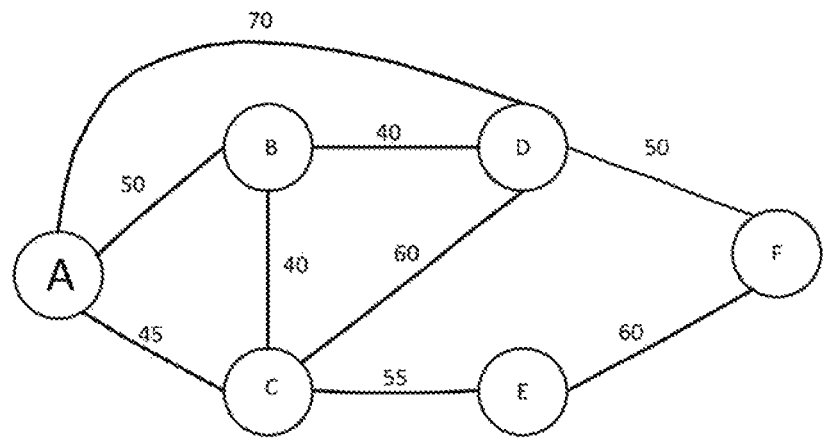
FIG. 6 is a network topology diagram of a Bluetooth device in an embodiment of the present disclosure.

Referring to the network topology diagram of the Bluetooth device shown in FIG. 6, the numbers marked in FIG. 6 indicate the connection costs among the Bluetooth devices, A represents the central node selected by the upgrade device, and other points except A represent the to-be-upgraded devices. In the embodiment, the solving of the upgrade paths in the network topology diagram of FIG. 6 is taken as an example, and the network topology diagram of FIG. 6 can also be seen as the network topology diagram of the to-be-upgraded devices in the Bluetooth cluster. It should be noted that according to the prior art, those skilled in the art can obtain the network topology of the to-be-upgraded devices from device information of all of the Bluetooth devices in the Bluetooth cluster. In addition, it should be understood by those skilled in the art that the solving of the upgrade paths of the network topology diagram of FIG. 6 is only an exemplary description, and in actual use, those skilled in the art may refer to the solution of the embodiment of the present disclosure to solve other upgrade paths of the network topology diagram to upgrade the Bluetooth cluster. The other network topology diagrams include but are not limited to all or a part of the Bluetooth devices in the Bluetooth cluster, and the other network topology diagrams may also include a Bluetooth device that does not need to be upgraded, the upgrade paths obtained by solving the other network topology diagrams may include the to-be-upgraded devices, or may include the Bluetooth device that does not need to be upgraded. Taking the method for calculating the connection cost in the first manner as an example, the upgrade paths in the network topology of FIG. 6 are solved. The Bluetooth device with the least connection cost to the central node is selected from the to-be-upgraded devices as the first-level to-be-upgraded device and is set as a first device, since E or F is not directly connected to A, the connection cost from A to E or F must be greater than the connection cost from A to B, C or D, therefore, only the connection cost from A to B, C or D needs to be analyzed. Moreover, since the connection cost from A to C is 45, which is lower than both of the connection cost from A to B and the connection cost from A to D, so C is set as the first-level to-be-upgraded device into the first devices, and the preceding Bluetooth device of C is recorded as A.

Figure 7:
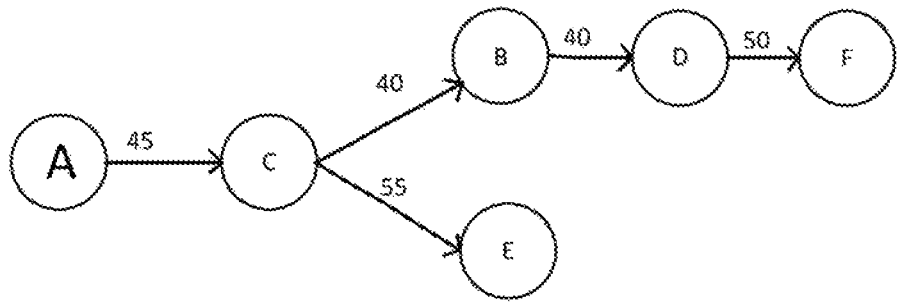
FIG. 7 is a schematic diagram of an upgrade path obtained based on the solving of the network topology diagram of FIG. 6 according to an embodiment of the present disclosure.

Now the first devices are A and C, and the second devices B, D, E and F are analyzed, since F is not connected to the first device, the connection cost from the first device to F then must be greater than the connection cost from the first device to B, D or E, so only the connection cost from the first device to B, D, and E needs to be analyzed. First the connection cost from the first device to B is analyzed, the connection cost directly from A to B is 50, while the connection cost from A to B through C in the upgrade path is the maximum value between 45 and 40, i.e., 45; specifically, in the cross-level calculation, it is not set to infinity, because the non-cross-level calculation is for the second device, here C belongs to the first device, in the following description, a similar principle is adopted and will not be elaborated again for the sake of brevity. Therefore, the connection cost from A to B through C in the upgrade path is smaller, i.e., 45. Then the connection cost from the first device to D is analyzed, the connection cost directly from the central node A to D is 70, while the connection cost from the central node to D through C in the upgrade path is the maximum value between 45 and 60, i.e., 60. Therefore, the connection cost from A to D through C in the upgrade path is smaller, i.e., 60. Finally, the connection cost from the first device to E is analyzed, the connection cost directly from the central node A to E is infinite since it is necessary to pass other second devices; the connection cost from the central node to E through C in the first devices is the maximum value between 45 and 55, i.e., 55; therefore, the connection cost from A to E through C in the first devices is smaller, i.e., 55. In summary, the minimum connection cost from A to B, D, and E is 45, 60, and 55 respectively, therefore, B is selected to join the first devices, and C is recorded as the preceding Bluetooth device of B. And so on, reference may be made to FIG. 7 for the upgrade paths obtained.

Taking the solving of the upgrade paths in the network topology diagram of FIG. 6 as an example, the method for calculating the connection cost is the first manner. The algorithm for calculating the upgrade paths is defined as follows: let the connection cost from the central node to the to-be-upgraded device n to be D(n)=min(D'(n), max(D(w), D(w, n)));

Symbol Definition:

N represents a set of to-be-upgraded devices in the first devices;

w represents that a to-be-upgraded device added to N;

n represents any one of next-level to-be-upgraded devices of w that is not in N;

D'(n) represents the connection cost directly from the central node to n;

D(w) represents the connection cost from the central node to w;

D(w,n) represents the connection cost directly from w to n;

max(D(w), D(w, n)) represents the connection cost from the central node to n through w.

Figure 8:
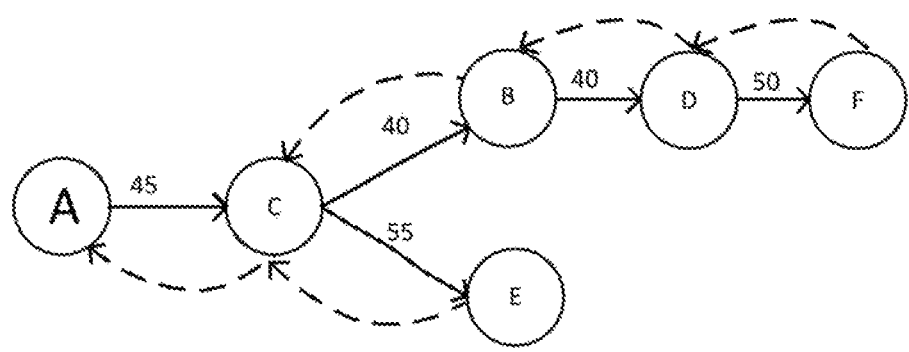
FIG. 8 is a schematic diagram of transferring paths of upgrade data and upgrade result information obtained based on the solving of the network topology diagram of FIG. 6 according to an embodiment of the present disclosure.

According to the symbol definitions, the meaning of the expression D(n)=min(D'(n), max(D(w), D(w,n))) is explained as follows: if n can be connected to the central node without passing any other to-be-upgraded devices, then D'(n) is not infinite, and is compared with max(D(w), D(w, n)). Note that w may be one or more to-be-upgraded devices, if D'(n) is small, it is proved that the connection cost directly from the central node to n is smaller, if max(D(w), D(w, n)) is small, it is proved that the connection cost from the central node to n through w is smaller. The execution steps of the algorithm are as follows:

S1: initializing N, since there is no to-be-upgraded device in N at this time, it is unnecessary to calculate the connection cost from the central node to n through w, only the connection cost from the central node to n needs to be directly calculated, that is, D(n)=min D'(n);

S2: calculating D(n) and recording the preceding Bluetooth device of n;

S3: finding the w that minimizes D(n), and adding w to the set N, and recording the preceding Bluetooth device of n;

S4: updating D(n);

S5: repeating steps S3 and S4 until all to-be-upgraded devices are added to the set N. The upgrade paths obtained according to the algorithm can be referred to FIG. 7, and the transferring paths for the upgrade data and upgrade result information can be referred to FIG. 8, where the solid line indicates a sending direction of the upgrade data, the dotted line indicates the sending direction of the upgrade result information, the transferring paths of the upgrade result information are the same as the transferring paths of the upgrade data, but with opposite directions. It should be noted that as the Bluetooth device needs to be restarted after the upgrade, in order to send the upgrade result information, the Bluetooth device needs to re-establish the connection with the preceding Bluetooth device. If it fails to re-establish the connection with the preceding Bluetooth device, then the Bluetooth device will establish the connection with other preceding Bluetooth devices according to the upgrade path. In addition, it should be understood by those skilled in the art that the algorithm for calculating the upgrade path provided by the embodiment is only an exemplary description. In actual use, those skilled in the art may refer to the solution of the embodiment of the present disclosure to select other algorithms for calculating the upgrading path.

Optionally, after selecting the upgrade path, the upgrade device sets the upgrade path into the upgrade data, or the upgrade device sends the upgrade path to the to-be-upgraded device through the central node. The upgrade path herein includes all the information about the upgrade path, including a data transferring relationship between the to-be-upgraded device and its preceding Bluetooth device, as well as a data transferring relationship between the to-be-upgraded devices, so that the Bluetooth device can send the upgrade data according to the upgrade path, and the Bluetooth device may judge whether to send the upgrade data and the objective to which the upgrade data is sent according to the upgrade path information before sending the upgrade data, therefore, the upgrade device sends the upgrade path to the to-be-upgraded device before sending the upgrade data. In addition, the upgrade path information can also be transferred using the upgrade path.

The embodiment of the present disclosure provides an online upgrade method for a Bluetooth cluster, where a central node is selected to establish a Bluetooth connection with an upgrade device to transit upgrade data according to a connection relationship between Bluetooth devices in a Bluetooth cluster, and an upgrade path is selected and an upgrade is executed on a to-be-upgraded device in the Bluetooth cluster according to the upgrade path. In this way, an upgrade success rate of the Bluetooth cluster is improved, and upgrade time-consumption is shortened. The online upgrade method of the Bluetooth cluster adopted in the present disclosure further broadens a communication range of the Bluetooth, which requires no one-to-one operation by a user and saves operation time. Furthermore, the connections among the Bluetooth devices in the existing Bluetooth cluster are used to send the upgrade data, on one hand, the upgrade device does not need to send upgrade data for multiple times, thus solving the data congestion problem caused by multiple Bluetooth devices accessing the upgrade device at the same time; on the other hand, since the upgrade data of most of the Bluetooth devices does not need to be directly obtained from the upgrade device, the amount of Bluetooth devices, through which the upgrade data is transmitted, is significantly reduced, thus making the upgrade time-consumption significantly reduced for a large-scale Bluetooth cluster with a large number of layers. Moreover, the upgrade of multiple Bluetooth devices in the Bluetooth cluster can be completed simply through operations on the upgrade device side, thereby providing more convenient and more efficient services for the user.

In the following, the embodiment of the present disclosure describes the online upgrade method of the Bluetooth cluster provided by the embodiment of the present disclosure from the perspective of a Bluetooth device.

Figure 9:
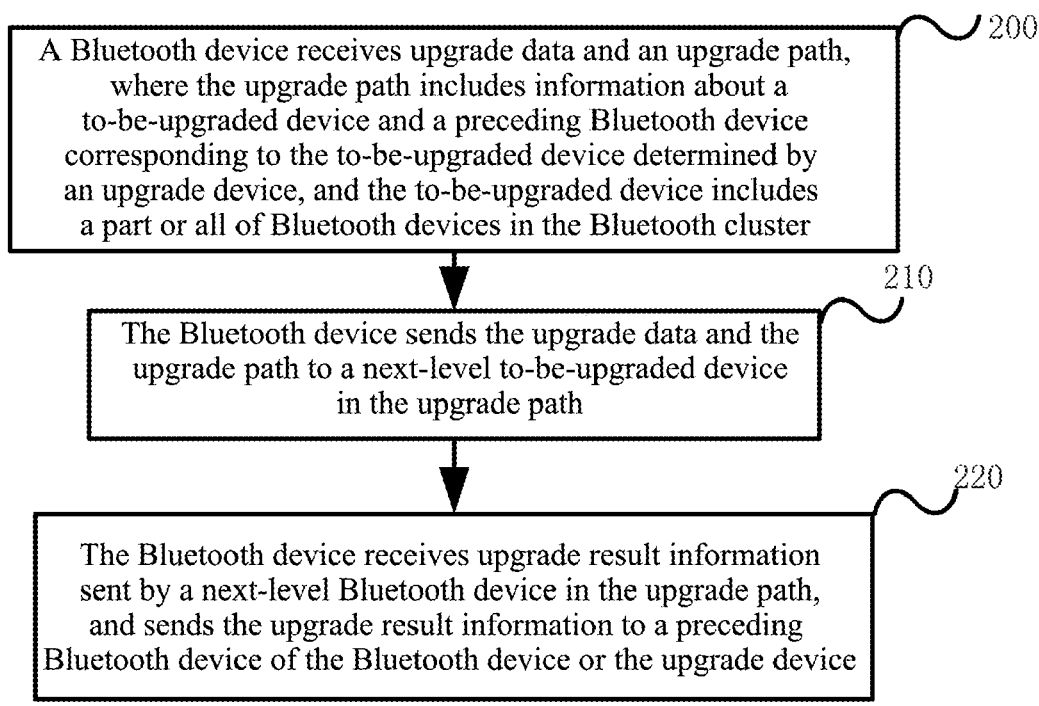
FIG. 9 is a flowchart of an online upgrade method of a Bluetooth cluster on a Bluetooth device side according to an embodiment of the present disclosure.

Referring to FIG. 9, which is a flowchart of an online upgrade method of a Bluetooth cluster according to an embodiment of the present disclosure, the method includes:

Step 200: A Bluetooth Device Receives Upgrade Data and an Upgrade Path, where the Upgrade Path Includes Information about a to-be-Upgraded Device and a Preceding Bluetooth Device Corresponding to the to-be-Upgraded Device Determined by an Upgrade Device, and the to-be-Upgraded Device Includes a Part or all of Bluetooth Devices in the Bluetooth Cluster.

It should be noted that the Bluetooth device herein may be a central node or a non-central node; it may be a to-be-upgraded device or a Bluetooth device that does not need to be upgraded, which is not limited in the embodiment of the present disclosure.

Optionally, before the Bluetooth device receiving the upgrade data and the upgrade path, the method further includes:

the Bluetooth device receives a device information request instruction sent by an upper-level Bluetooth device connected to the Bluetooth device or the upgrade device, and sends the device information request instruction to a next-level Bluetooth device connected to the Bluetooth device;

the Bluetooth device receives device information sent by the next-level Bluetooth device connected to the Bluetooth device, and sends the device information and device information of the Bluetooth device to the upgrade device or the upper-level Bluetooth device connected to the Bluetooth device. It should be noted that the upper-level Bluetooth device and the next-level Bluetooth device are simply mentioned with reference to an original connection relationship in the Bluetooth cluster where the Bluetooth device is located (that is, the connection relationship can be obtain by the upgrade device according to the device information), rather than the upgrade path, the upgrade device may select the upgrade path after receiving all the device information.

For the central node, after the central node connects the upgrade device through Bluetooth, the upgrade device can obtain the device information through the central node. After receiving all the device information, the upgrade device can generate a network topology diagram according to the received device information, thus making the user understand the connection relationship of the Bluetooth devices in the Bluetooth cluster conveniently, and facilitating the user to select the to-be-upgraded device. Before the obtaining of the device information, the upgrade device is required to send the device information request instruction to all of the Bluetooth devices in the Bluetooth cluster, the upgrade device sends the device information request instruction to the central node, the central node receives the device information request instruction sent by the upgrading device, and then the central node will send its own device information to the upgrade device and send the device information request instruction to all of the Bluetooth devices in the Bluetooth cluster. After receiving the device information of other Bluetooth devices, the central node sends the device information of the other Bluetooth devices to the upgrade device.

For a Bluetooth device other than the central node, after receiving the device information request instruction sent by an upper-level Bluetooth device, said Bluetooth device sends its own device information to said upper-level Bluetooth device, and sends the device information request instruction to a next-level Bluetooth device, until all of the Bluetooth devices receive the device information request instruction, the device information sent by the Bluetooth device will be sent to the upgrade device through the central node.

In step 200, the Bluetooth device may receive the upgrade data and the upgrade path in at least two manners, the first manner is that the upgrade data received by the Bluetooth device includes upgrade path information, that is, the upgrade device sets the upgrade path into the upgrade data; the second manner is that the Bluetooth device receives the upgrade path before receiving the upgrade data, as mentioned above, before sending the upgrade data, the upgrade device has sent the upgrade path to the to-be-upgraded device through the central node, where the upgrade path includes all the information about the upgrade path, including the information of the to-be-upgraded device and its preceding Bluetooth device, as well as the data transferring relationship between the to-be-upgraded devices, and after receiving the upgrade path, the Bluetooth device can determine whether to send the upgrade data and the sending objective, as well as whether the Bluetooth device per se needs to perform an upgrade.

In step 200, after receiving one frame of upgrade data, the Bluetooth device verifies the one frame of upgrade data, saves the one frame of upgrade data that is successfully verified after a successful verification, and saves a second frame of upgrade data after the second frame of upgrade data is successfully verified, until the whole upgrade data has been verified and saved. In this process, if the verification for a certain frame of upgrade data fails, the Bluetooth device can request to retransmit this frame of upgrade data for which the verification fails to ensure the success rate of the upgrade. Then, the Bluetooth device sends the received upgrade data to the next-level to-be-upgraded device according to the upgrade path.

Step 210: the Bluetooth device sends the upgrade data and the upgrade path to a next-level to-be-upgraded device in the upgrade path.

In step 210, if the Bluetooth device is directly connected to the next-level to-be-upgraded device in the upgrade path, then the upgrade data and the upgrade path are directly sent to the next-level to-be-upgraded device; if the upgrade device must pass a Bluetooth device that does not need to be upgraded to achieve the next-level to-be-upgraded device in the upgrade path, then the upgrade data and the upgrade path are sent to the next-level to-be-upgraded device through the Bluetooth device that does not need to be upgraded.

Step 220: The Bluetooth Device Receives Upgrade Result Information Sent by a Next-Level Bluetooth Device in the Upgrade Path, and Sends the Upgrade Result Information to a Preceding Bluetooth Device of the Bluetooth Device or the Upgrade Device.

In step 220, the upgrade result information which is sent by the next-level Bluetooth device in the upgrade path and received by the Bluetooth device includes not only the upgrade result information of its next-level Bluetooth device, but also the upgrade result information of other Bluetooth devices received by the next-level Bluetooth device.

For the central node, if the central node needs to be upgraded, it performs the upgrade after sending the upgrade result information sent by the to-be-upgraded device to the upgrade device, after completing the upgrade, the central node establishes the connection with the upgrade device and sends its own upgrade result information to the upgrade device.

For the to-be-upgraded device, after sending the upgrade result information sent by the next-level to-be-upgraded device to the upper-level to-be-upgraded device, the to-be-upgraded device performs the upgrade, after completing the upgrade, the to-be-upgraded device establishes the connection with the upper-level to-be-upgraded device and sends its own upgrade result information to the upper-level to-be-upgraded device.

For a Bluetooth device that does not need to be upgraded, it simply serves to transfer data and does not perform any upgrade. The data herein includes but is not limited to the upgrade data and the upgrade result information.

With the manner in which the last-level to-be-upgraded device is upgraded firstly, if the upgrade is interrupted during the upgrade process of the Bluetooth device, the upgraded Bluetooth device will not participate in the upgrade during a re-upgrade, thus shortening the upgrade path and saving the upgrade time-consumption for the re-upgrade, and if the to-be-upgraded device which receives the upgrade data first is upgraded first, during the upgrade of the Bluetooth cluster, there may still exist a to-be-upgraded device in the upgrade path, nevertheless, the to-be-upgraded device does not need to be upgraded and simply serves as a Bluetooth device for transmitting data. However, it should be understood by those skilled in the art that the manner in which the last-level to-be-upgraded device is upgraded firstly is only an exemplary description, in actual use, those skilled in the art may refer to the solution of the embodiment of the present disclosure to select other upgrade strategies, including: upgrading a first-level to-be-upgraded device in the first place, or upgrading the to-be-upgraded device as long as the to-be-upgraded device receives the upgrade data. Different upgrade strategies may bring about different advantageous effects, for example, regarding the method in which the to-be-upgraded device is upgraded as long as the to-be-upgraded device receives the upgrade data, this method may achieve a faster upgrade of the Bluetooth cluster. Optionally, after the Bluetooth device sends the upgrade result information to the preceding Bluetooth device of the Bluetooth device or the upgrade device, the method further includes: the Bluetooth device executes an upgrade by using the upgrade data; and the Bluetooth device sends its upgrade result information to the preceding Bluetooth device of the Bluetooth device or the upgrade device according to the upgrade path. After the Bluetooth device sends the upgrade result information to the preceding Bluetooth device of the Bluetooth device or the upgrade device, there are two cases. Firstly, for the to-be-upgraded device, that is, the Bluetooth device that needs to be upgraded, the Bluetooth performs the upgrade after receiving the upgrade result information of its next-level to-be-upgraded device, after completing the upgrade, the Bluetooth device re-establishes the connection with its preceding Bluetooth device, and the Bluetooth device sends its own upgrade result information to the preceding Bluetooth device according to the upgrade path, and finally the upgrade result information is sent to the upgrade device through the central node. The case where the central node needs to be upgraded has already been explained in the foregoing description, which will not be elaborated herein again.

After the upgrade data and the upgrade result information have been sent according to the upgrade path, the upgrade result information can be stored and displayed to facilitate the user to view the upgrade result. After the upgrade is completed, nodes whose upgrades have failed will be automatically upgraded to ensure that all the nodes complete their upgrades.

The embodiment of the present disclosure provides an online upgrade method for a Bluetooth cluster, where a central node is selected to establish a Bluetooth connection with an upgrade device to transit upgrade data according to the connection relationship between Bluetooth devices in a Bluetooth cluster, and an upgrade path is selected and an upgrade is executed on a to-be-upgraded device in the Bluetooth cluster according to the upgrade path. In this way, an upgrade success rate of the Bluetooth cluster is improved, and upgrade time-consumption is shortened. The online upgrade method of the Bluetooth cluster adopted in the present disclosure further broadens a communication range of the Bluetooth, which requires no one-to-one operation by a user and saves operation time. Furthermore, the connections among the Bluetooth devices in the existing Bluetooth cluster are used to send the upgrade data, on one hand, the upgrade device does not need to send upgrade data for multiple times, thus solving the data congestion problem caused by multiple Bluetooth devices accessing the upgrade device at the same time; on the other hand, since the upgrade data of most of the Bluetooth devices does not need to be directly obtained from the upgrade device, the amount of Bluetooth devices, through which the upgrade data is transmitted, is significantly reduced, thus making the upgrade time-consumption significantly reduced for a large-scale Bluetooth cluster with a large number of layers. Moreover, the upgrade of multiple Bluetooth devices in the Bluetooth cluster can be completed simply through operations on the upgrade device side, thereby providing more convenient and more efficient services for the user.

Figure 10:
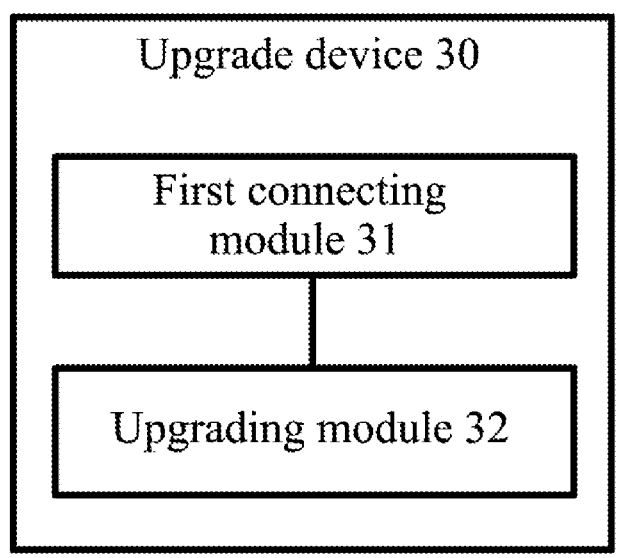
FIG. 10 is a schematic structural diagram of an upgrade device according to an embodiment of the present disclosure.

The embodiment of the present disclosure may further provide an upgrade device, which is configured to perform the online upgrade method of the Bluetooth cluster proposed in the foregoing embodiment. FIG. 10 is a schematic structural diagram of an upgrade device provided by the embodiment, and the device can execute the method shown in foregoing FIG. 2 to FIG. 8, as shown in FIG. 10, the upgrade device 30 includes:

a first connecting module 31, configured to select a central node in the Bluetooth cluster, and establish a Bluetooth connection with the central node; and an upgrading module 32, configured to select an upgrade path, and send upgrade data to a to-be-upgraded device through the central node according to the upgrade path, enabling the to-be-upgraded device to obtain the upgrade data to achieve an upgrade, where the to-be-upgraded device includes a part or all of the Bluetooth devices in the Bluetooth cluster.

Optionally, the apparatus further includes:

a second connecting module, configured to establish the connection with a Bluetooth device that has turned on a broadcast in the Bluetooth cluster before the first connecting module selects the central node in the Bluetooth cluster;

a first sending module, configured to send an instruction for turning on a broadcast to a Bluetooth device that has not turned on the broadcast in the Bluetooth cluster through the Bluetooth device connected to the second connecting module; and a scanning module, configured to update scanned Bluetooth devices.

Optionally, the first connecting module further includes:

a first selecting submodule, configured to select, according to strengths of receiving powers of the Bluetooth devices scanned by the scanning module, one or more Bluetooth devices with a strongest receiving power as the central node of the Bluetooth cluster; or select, according to amounts of next-level Bluetooth devices connected to the Bluetooth devices scanned by the scanning module, one or more Bluetooth devices with a largest amount of next-level Bluetooth devices connected as the central node of the Bluetooth cluster.

Optionally, the upgrade device further includes:

a second sending module, configured to send a device information request instruction to all of the Bluetooth devices in the Bluetooth cluster through the central node after the first connecting module establishes the Bluetooth connection with the central node;

a first receiving module, configured to receive the device information of all of the Bluetooth devices sent by the central node; and a second selecting module, configured to determine the to-be-upgraded device.

In addition, the upgrading module includes:

a querying submodule, configured to query to an outer layer with the central node as a center, and determine preceding Bluetooth devices for all the to-be-upgraded devices; and a path generation submodule, configured to generate the upgrade path according to the to-be-upgraded device and the preceding Bluetooth device corresponding to the to-be-upgraded device.

Optionally, the querying submodule includes:

a preceding Bluetooth device determining unit, configured to select, according to a connection cost from the central node to the to-be-upgraded device, one or more to-be-upgraded devices with a least connection cost as a first device, where a to-be-upgraded device other than the first device is a second device; recode a corresponding central node as a preceding Bluetooth device of the to-be-upgraded device with the least connection cost; select, according to a connection cost from the central node or the first device to the second device, one or more to-be-upgraded device with a least connection cost to join the first device, and record a corresponding first device as a preceding Bluetooth device of the to-be-upgraded device with the least connection cost; repeat the previous step until preceding Bluetooth devices for all the to-be-upgraded devices are determined.

Optionally, the upgrading module further includes:

a setting submodule, configured to set the upgrade path into the upgrade data; or, the upgrading module is further configured to send the upgrade path to the to-be-upgraded device through the central node.

Figure 11:
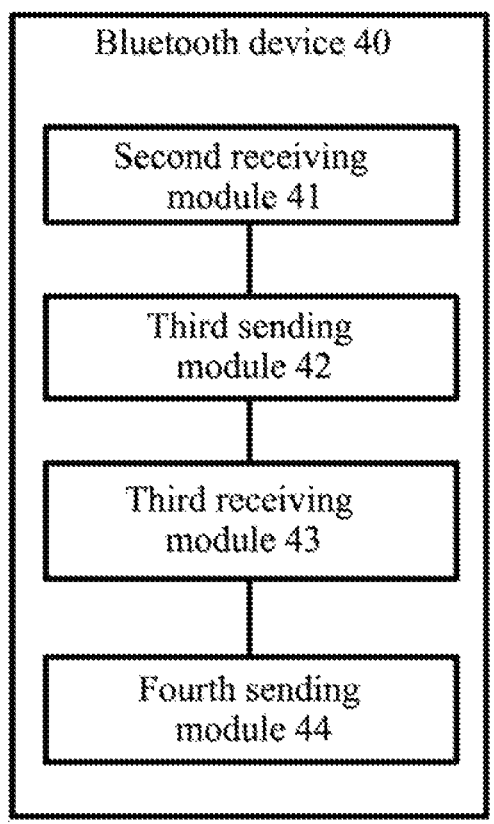
FIG. 11 is a schematic structural diagram of a Bluetooth device according to an embodiment of the present disclosure.

The embodiment of the present disclosure provides an upgrade device, where a central node is selected to establish a Bluetooth connection with an upgrade device to transit upgrade data according to a connection relationship between Bluetooth devices in a Bluetooth cluster, and an upgrade path is selected and an upgrade is executed on a to-be-upgraded device in the Bluetooth cluster according to the upgrade path. In this way, an upgrade success rate of the Bluetooth cluster is improved, and upgrade time-consumption is shortened. The online upgrade method of the Bluetooth cluster adopted in the present disclosure further broadens a communication range of the Bluetooth, which requires no one-to-one operation by a user and saves operation time. Furthermore, the connections among the Bluetooth devices in the existing Bluetooth cluster are used to send the upgrade data, on one hand, the upgrade device does not need to send upgrade data for multiple times, thus solving the data congestion problem caused by multiple Bluetooth devices accessing the upgrade device at the same time; on the other hand, since the upgrade data of most of the Bluetooth devices does not need to be directly obtained from the upgrade device, the amount of Bluetooth devices, through which the upgrade data is transmitted, is significantly reduced, thus making the upgrade time-consumption significantly reduced for a large-scale Bluetooth cluster with a large number of layers. Moreover, the upgrade of multiple Bluetooth devices in the Bluetooth cluster can be completed simply through operations on the upgrade device side, thereby providing more convenient and more efficient services for the user. The embodiment of the present disclosure may further provide a Bluetooth device, which is configured to perform the online upgrade method of the Bluetooth cluster provided by the foregoing embodiment, and FIG. 11 is a schematic structural diagram of a Bluetooth device provided by the embodiment, the Bluetooth device can perform the method shown in FIG. 9. As shown in FIG. 11, the Bluetooth device 40 includes:

a second receiving module 41, configured to receive upgrade data and an upgrade path, where the upgrade path includes information about a to-be-upgraded device and a preceding Bluetooth device corresponding to the to-be-upgraded device determined by an upgrade device, and the to-be-upgraded device includes a part or all of Bluetooth devices in the Bluetooth cluster;

a third sending module 42, configured to send the upgrade data and the upgrade path to a next-level to-be-upgraded device in the upgrade path;

a third receiving module 43, configured to receive upgrade result information sent by a next-level Bluetooth device in the upgrade path; and a fourth sending module 44, configured to send the upgrade result information to a preceding Bluetooth device of the Bluetooth device or the upgrade device.

Optionally, the Bluetooth device further includes:

a fourth receiving module, configured to receive a device information request instruction sent by an upper-level Bluetooth device connected to the Bluetooth device or the upgrade device, before the first receiving module receives the upgrade data and the upgrade path;

a fifth sending module, configured to send the device information request instruction to a next-level Bluetooth device connected to the Bluetooth device;

a fifth receiving module, configured to receive device information sent by the next-level Bluetooth device connected to the Bluetooth device; and a sixth sending module, configured to send the device information to the upgrade device, or send the device information and device information of the Bluetooth device to the upper-level Bluetooth device connected to the Bluetooth device.

Optionally, the Bluetooth device further includes: an upgrade executing module, configured to execute an upgrade on the Bluetooth device according to the upgrade data, after the fourth sending module sends the upgrade result information to the preceding Bluetooth device of the Bluetooth device or the upgrade device; and a seventh sending module, configured to send upgrade result information of the Bluetooth device to the preceding Bluetooth device of the Bluetooth device or the upgrade device according to the upgrade path.

The embodiment of the present disclosure provides a Bluetooth device, where a central node is selected to establish a Bluetooth connection with an upgrade device to transit upgrade data according to a connection relationship between Bluetooth devices in a Bluetooth cluster, and an upgrade path is selected and an upgrade is executed on a to-be-upgraded device in the Bluetooth cluster according to the upgrade path. In this way, an upgrade success rate of the Bluetooth cluster is improved, and upgrade time-consumption is shortened. The online upgrade method of the Bluetooth cluster adopted in the present disclosure further broadens a communication range of the Bluetooth, which requires no one-to-one operation by a user and saves operation time. Furthermore, the connections among the Bluetooth devices in the existing Bluetooth cluster are used to send the upgrade data, on one hand, the upgrade device does not need to send upgrade data for multiple times, thus solving the data congestion problem caused by multiple Bluetooth devices accessing the upgrade device at the same time; on the other hand, since the upgrade data of most of the Bluetooth devices does not need to be directly obtained from the upgrade device, the amount of Bluetooth devices, through which the upgrade data is transmitted, is significantly reduced, thus making the upgrade time-consumption significantly reduced for a large-scale Bluetooth cluster with a large number of layers. Moreover, the upgrade of multiple Bluetooth devices in the Bluetooth cluster can be completed simply through operations on the upgrade device side, thereby providing more convenient and more efficient services for the user.

Figure 12:
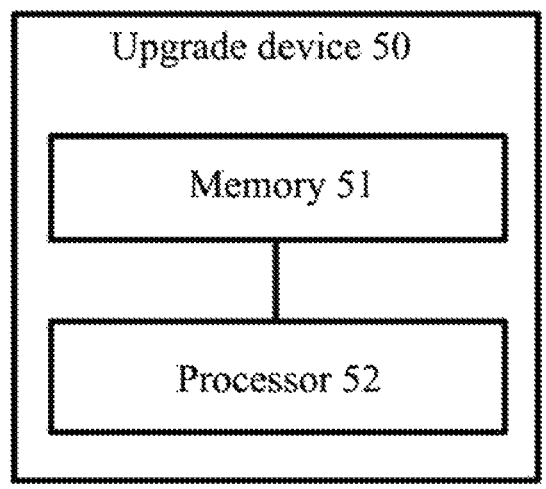
FIG. 12 is a schematic structural diagram of another upgrade device according to an embodiment of the present disclosure.

The embodiment of the present disclosure may further provide an upgrade device, which is configured to perform the online upgrade method of the Bluetooth cluster provided by the embodiments. As shown in FIG. 12, the device 50 includes: a memory 51 and a processor 52;

the memory 51 is coupled to the processor 52;

the memory 51 is configured to store program instructions;

the processor 52 is configured to invoke the program instructions stored in the memory, enabling the upgrade device to execute the online upgrade method of the Bluetooth cluster.

The upgrade device provided by the embodiment of the present disclosure may perform the online upgrade method of the Bluetooth cluster executed by the upgrade device according to any of the foregoing embodiments, reference may be made to the foregoing description for the specific implementation process and advantageous effects, which are not elaborated herein.

Figure 13:
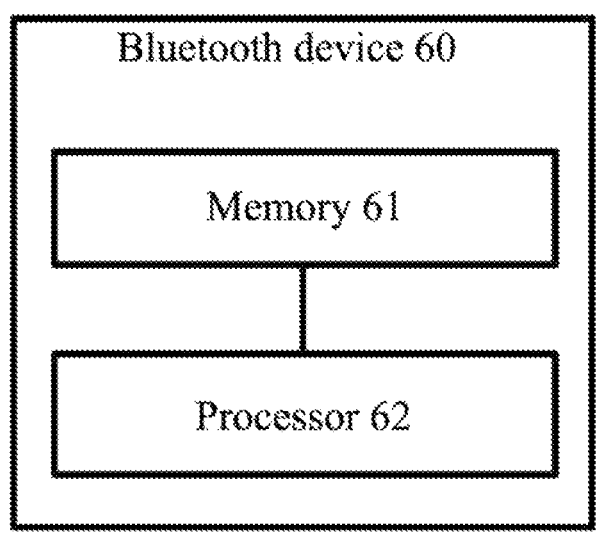
FIG. 13 is a schematic structural diagram of another Bluetooth device according to an embodiment of the present disclosure.

The embodiment of the present disclosure may further provide a Bluetooth device, which is configured to perform the online upgrade method of the Bluetooth cluster. As shown in FIG. 13, the device 60 includes: a memory 61 and a processor 62;

the memory 61 is coupled to the processor 62;

the memory 61 is configured to store program instructions;

the processor 62 is configured to invoke the program instructions stored in the memory, enabling the Bluetooth device to execute the online upgrade method of the Bluetooth cluster.

The Bluetooth device provided by the embodiment of the present disclosure may execute the online upgrade method of the Bluetooth cluster executed by the Bluetooth device according to any of the foregoing embodiments, reference may be made to the foregoing description for the specific implementation process and advantageous effects, which are not elaborated herein.

The embodiment of the present disclosure may further provide a computer readable storage medium with a computer program stored thereon, and the computer program, when executed by the processor 52, can implement the online upgrade method of the Bluetooth cluster executed by the upgrade device.

The computer readable storage medium provided by the embodiment of the present disclosure may perform the online upgrade method of the Bluetooth cluster executed by the upgrade device according to any of the foregoing embodiments, reference may be made to the foregoing description for the specific implementation process and advantageous effects, which are not elaborated herein.

The embodiment of the present disclosure may further provide a computer readable storage medium with a computer program stored thereon, and the computer program, when executed by the processor 62, can implement the online upgrade method of the Bluetooth cluster executed by the Bluetooth device.

The computer readable storage medium provided by the embodiment of the present disclosure may execute the online upgrade method of the Bluetooth cluster executed by the Bluetooth device according to any of the foregoing embodiments, reference may be made to the foregoing description for the specific implementation process and advantageous effects, which are not elaborated herein.

It should be noted that the above method embodiments of the present disclosure may be applied to the processor or implemented by the processor. The processor may be an integrated circuit chip with signal processing capabilities. In the implementation process, each step of the foregoing method embodiment may be implemented by an integrated logic circuit of hardware in a processor or an instruction in software. The above processor may be a general purpose processor, a digital signal processor (DSP), an application specific integrated circuit (ASIC), a field programmable gate array (FPGA) or other programming logic devices, discrete gates or transistor logic devices, discrete hardware components. The methods, steps, and logical block diagrams disclosed in the embodiments of the present disclosure can be implemented or executed. The general purpose processor may be a microprocessor or the processor may be any conventional processor or the like. The steps of the method disclosed in combination with the embodiments of the present disclosure may be directly implemented by a hardware decoding processor, or may be performed by a combination of hardware and software modules in the decoding processor. The software module can be located in a mature storage medium in the art such as a random access memory, a flash memory, a read only memory, a programmable read only memory, an electrically erasable programmable memory, a register and the like. The storage medium is located in the memory, and the processor reads the information in the memory and combines the hardware to complete the steps of the above method.

It can be understood that the memory in the embodiments of the present disclosure may be a volatile memory or a non-volatile memory, or may include both volatile and non-volatile memory. Where the non-volatile memory may be a read-only memory (ROM), a programmable read only memory (PROM), an erasable PROM (EPROM), an electrical EPROM (EEPROM) or a flash memory. The volatile memory can be a random access memory (RAM) that acts as an external cache. By way of example rather than limitation, many forms of RAM are available, such as a static random access memory (SRAM), a dynamic random access memory (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory of the system and method described herein is intended to include, but not limit to these and any other suitable types of memory.

It should be understood that in the embodiment of the present disclosure, "B corresponding to A" means that B is associated with A, and B can be determined according to A. However, it should also be understood that determining B according to A does not mean that B is determined only based on A, and that B can also be determined based on A and/or other information.

In addition, the term "and/or" herein is merely an association relationship describing an associated object, indicating that there may be three relationships, for example, A and/or B, which may indicate that A exists separately, A and B exist at the same time, and B exists separately. In addition, the character "/" in this article generally indicates that the contextual object is an "or" relationship.

Those skilled in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. Those skills in the art can use different methods to implement the described functions for each particular application, but such implementation should not be considered to be beyond the scope of the present disclosure.

Those skilled in the art can clearly understand that for the convenience and brevity of the description, the specific working process of the system, the device and the unit described above can refer to the corresponding process in the foregoing method embodiment, and are not elaborated herein.

In the several embodiments provided by the present disclosure, it should be understood that the disclosed systems, apparatus, and methods may be implemented in other manners. For example, the apparatus embodiments described above are merely illustrative, for example, the division of the unit is only a logical function division, there may be other division manners in actual implementations, for example, multiple units or components may be combined or can be integrated into another system, or some features can be ignored or not executed. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components displayed as units may or may not be physical units, that is, they may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit.

The functions may be stored in the computer readable storage medium if it is implemented in the form of a software functional unit and sold or used as a standalone product. Based on such understanding, the essence of the technical solution of the present disclosure, or the contributing part to the prior art, or a part of the technical solution may be embodied in the form of a software product, which is stored in a storage medium, including a number of instructions so that a computer device (which may be a personal computer, a server, or a network device, etc.) can perform all or part of the steps of the methods described in various embodiments of the present disclosure. The foregoing storage medium includes: a U disk, a mobile hard disk, a read-only memory (ROM), a random access memory (RAM), a magnetic disk, an optical disk and the like, which can store program code.

The foregoing is only a specific implementation of the present disclosure, but the scope of protection of the present disclosure is not limited thereto, and any skilled in the art can easily think of changes or substitutions within the technical scope disclosed in the present disclosure, which should be covered by the scope of protection of this application. Therefore, the scope of protection of the present disclosure should be determined by the scope of the claims.

What is claimed is:

1. An online upgrade method for a Bluetooth cluster, comprising:
    selecting, by an upgrade device, a central node in the Bluetooth cluster and establishing a Bluetooth connection with the central node, wherein the Bluetooth cluster is a group of independent wirelessly interconnected Bluetooth devices; and
    selecting, by the upgrade device, an upgrade path, and sending upgrade data to a to-be-upgraded device through the central node according to the upgrade path, enabling the to-be-upgraded device to obtain the upgrade data to achieve an upgrade, wherein the to-be-upgraded device comprises a part or all of Bluetooth devices in the Bluetooth cluster, wherein the upgrade path comprises a data transmission path selected for the to-be-upgraded device from a plurality of data transmission paths between the upgrade device and the to-be-upgraded device;
    wherein the selecting, by the upgrade device, a central node in the Bluetooth cluster comprises:
    selecting, by the upgrade device, according to strengths of receiving powers of the Bluetooth devices scanned by the upgrade device, one or more Bluetooth devices with a strongest receiving power as one or more central nodes of the Bluetooth cluster; or selecting, by the upgrade device, according to amounts of next-level Bluetooth devices connected to the Bluetooth devices scanned by the upgrade device, one or more Bluetooth devices with a largest amount of next-level Bluetooth devices connected as the one or more central nodes of the Bluetooth cluster;
    wherein the selecting, by the upgrade device, an upgrade path comprises:
    querying, by the upgrade device, to an outer layer with the central node as a center, and determining a preceding Bluetooth device for the to-be-upgraded device; and
    generating, by the upgrade device, the upgrade path according to the to-be-upgraded device and the preceding Bluetooth device corresponding to the to-be-upgraded device;
    wherein the querying, by the upgrade device, to an outer layer with the central node as a center, and determining a preceding Bluetooth device for the to-be-upgraded device comprises:
    selecting, according to a connection cost from the central node to the to-be-upgraded device, one or more to-be-upgraded devices with a least connection cost as one or more devices of a first type, and recording the central node as a preceding Bluetooth device of the one or more to-be-upgraded devices with the least connection cost, wherein a to-be-upgraded device other than the one or more devices of the first type is a device of a second type;
    selecting, according to a connection cost from the central node and the one or more devices of the first type to the device of the second type, one or more to-be-upgraded devices with a least connection cost from the devices of the second type to join the one or more devices of the first type, and recording a device of the first type as a preceding Bluetooth device of the one or more to-be-upgraded devices with the least connection cost; and
    repeating the previous step until preceding Bluetooth devices for all to-be-upgraded devices are determined.

2. The online upgrade method of the Bluetooth cluster according to claim 1, wherein before the selecting, by an upgrade device, a central node in the Bluetooth cluster, the method further comprises:
    establishing, by the upgrade device, a connection with a Bluetooth device that has turned on a broadcast in the Bluetooth cluster;
    sending, by the upgrade device, an instruction for turning on a broadcast to a Bluetooth device that has not turned on the broadcast in the Bluetooth cluster through the Bluetooth device connected to the upgrade device; and
    updating, by the upgrade device, scanned Bluetooth devices.

3. The online upgrade method of the Bluetooth cluster according to claim 1, wherein after the establishing, by the upgrade device, a Bluetooth connection with the central node, the method further comprises:
    sending, by the upgrade device, a device information request instruction to all of the Bluetooth devices in the Bluetooth cluster through the central node;
    receiving, by the upgrade device, device information of all of the Bluetooth devices sent by the central node; and
    determining, by the upgrade device, the to-be-upgraded device.

4. The online upgrade method of the Bluetooth cluster according to claim 1, wherein after the selecting, by the upgrade device, an upgrade path, the method further comprises:
    setting, by the upgrade device, the upgrade path into the upgrade data; or
    sending, by the upgrade device, the upgrade path to the to-be-upgraded device through the central node.

5. An upgrade device for an online upgrade of a Bluetooth cluster, the upgrade device comprises a memory and a processor;
    the memory is coupled to the processor;
    the memory is configured to store program instructions;
    the processor is configured to invoke the program instructions stored in the memory, to enable the upgrade device to:
    select a central node in the Bluetooth cluster, and establishing a Bluetooth connection with the central node, wherein the Bluetooth cluster is a group of independent wirelessly interconnected Bluetooth devices; and
    select an upgrade path, and send upgrade data to a to-be-upgraded device through the central node according to the upgrade path, enabling the to-be-upgraded device to obtain the upgrade data to achieve an upgrade, wherein the to-be-upgraded device comprises a part or all of Bluetooth devices in the Bluetooth cluster, wherein the upgrade path comprises a data transmission path selected for the to-be-upgraded device from a plurality of data transmission paths between the upgrade device and the to-be-upgraded device;
    wherein the processor is further configured to invoke the program instructions stored in the memory, to enable the upgrade device to:

select according to strengths of receiving powers of the Bluetooth devices, one or more Bluetooth devices with a strongest receiving power as the central node of the Bluetooth cluster; or select, according to amounts of next-level Bluetooth devices connected to the Bluetooth devices, one or more Bluetooth devices with a largest amount of next-level Bluetooth devices connected as the central node of the Bluetooth cluster;

query to an outer layer with the central node as a center, and determine preceding Bluetooth devices for all the to-be-upgraded devices; and generate the upgrade path according to the to-be-upgraded device and the preceding Bluetooth device corresponding to the to-be-upgraded device;

select, according to a connection cost from the central node to the to-be-upgraded device, one or more to-be-upgraded devices with a least connection cost as one or more devices of a first type, wherein a to-be-upgraded device other than the one or more devices of the first type is a device of a second type; record the central node as a preceding Bluetooth device of the one or more to-be-upgraded devices with the least connection cost; select, according to a connection cost from the central node and the one or more devices of the first type to a device of the second type, one or more to-be-upgraded devices with a least connection cost to join the one or more devices of the first type, and record a device of the first type as a preceding Bluetooth device of the one or more to-be-upgraded devices with the least connection cost; and repeat the previous step until preceding Bluetooth devices for all the to-be-upgraded devices are determined.

6. The upgrade device according to claim 5, wherein the processor is further configured to invoke the program instructions stored in the memory, to enable the upgrade device to:

establish a connection with a Bluetooth device that has turned on a broadcast in the Bluetooth cluster before the processor selects the central node in the Bluetooth cluster;

send an instruction for turning on a broadcast to a Bluetooth device that has not turned on the broadcast in the Bluetooth cluster through the Bluetooth device connected to the upgrade device; and update scanned Bluetooth devices.

7. The upgrade device according to claim 5, wherein the processor is further configured to invoke the program instructions stored in the memory, to enable the upgrade device to:

send a device information request instruction to all of the Bluetooth devices in the Bluetooth cluster through the central node, after the processor establishes the Bluetooth connection with the central node;

receive device information of all of the Bluetooth devices sent by the central node; and determine the to-be-upgraded device.

8. The upgrade device according to claim 5, wherein the processor is further configured to invoke the program instructions stored in the memory, to enable the upgrade device to:

set the upgrade path into the upgrade data; or send the upgrade path to the to-be-upgraded device through the central node.

9. A non-transitory computer readable storage medium, comprising: a computer program stored thereon, wherein the computer program is executed by a processor to implement the online upgrade method of the Bluetooth cluster according to claim 1.

* * * * *